United States Patent Office 3,355,409
Patented Nov. 28, 1967

3,355,409
PREPARATION OF STABLE FILM FORMING AQUEOUS POLYAMIDE DISPERSIONS
Thomas C. Bissot, Grand Island, N.Y., assignor to E. I. du Pont de Nemours and Company, Wilmington, Del., a corporation of Delaware
No Drawing. Filed Apr. 29, 1965, Ser. No. 451,968
8 Claims. (Cl. 260—29.6)

This invention relates to aqueous dispersions of polyamides, and more particularly to film-forming, storage-stable aqueous dispersions of polyamides and to processes for the preparation thereof.

Aqueous dispersions of alcohol soluble polyamides are known in the art. These prior art dispersions may be classified into two general types. In one of these types of dispersions, the alcohol soluble polyamide is in an amorphous form and is stabilized by weak electrical forces to keep the polyamide particles dispersed. The solids contents of such dispersions are relatively low, on the order of about 10%. These are extremely unstable dispersions, being coagulated by small amounts of mechanical shear. Consequently, when such dispersions are applied to a substrate using a doctor blade, brushing, or other type of applicator which results in mechanical shear, the dispersion tends to "ball" and not flow into smooth films. These dispersions are film-forming, but it is difficult to make uniform films from them.

In the second type of dispersion, the alcohol soluble polyamide is in a semi-crystalline form, stabilized again by weak electrical forces. This type of dispersion may be prepared at higher solids content of up to 30–50%, and this type of dispersion is more stable to mechanical shear than the first type. However, it is quite viscous to the point of being pasty at the higher solids content level. The most serious disadvantage is that this type of dispersion is not film-forming at ambient temperatures, but dries to a powder or white mud-cracked film.

Polyamide dispersions are useful for textile impregnation. It would be desirable to incorporate polyamide dispersions into the so-called wash-wear treatment baths, used to impregnate textiles. However, these wash-wear treatment baths contain as catalysts, metal salts of acids such as zinc nitrate, magnesium chloride and ammonium sulfate. The prior art polyamide dispersions are not stable towards such ions. Consequently the prior art polyamide dispersions are not compatible with wash-wear treatment baths, coagulating when added to such baths.

It is an object of this invention to provide improved aqueous dispersions of alcohol soluble polyamides. Another object is to provide improved polyamide aqueous dispersions which are stable towards mechanical shear, and long-term storage, and which form strong uniform films at ambient temperatures. Still another object is to provide improved polyamide aqueous dispersions which are stable toward traces of acids and acid salts, and thus are compatible with common wash-wear treatment baths. A further object is to provide a practical and reproducible process for the preparation of these dispersions.

These and other objects are fully attained by the present invention which provides a film-forming, storage-stable aqueous dispersion comprising (a) a polyamide of a diamine and a dicarboxylic acid, (b) a modifier selected from the group consisting of phenols, aromatic alcohols and aromatic glycols, which at least swells the said polyamide, and (c) 5–15%, based on the total weight of said polyamide and said modifier, of a polyvinyl alcohol having a percent hydrolysis of 78–90%, and a 4% water solution viscosity of 20–45 centipoise as determined at 20° C. by the Hoeppler falling ball method.

This invention provides for the first time a polyamide aqueous dispersion which forms strong uniform films, and which is stable towards mechanical shear, and foreign ions, and possesses long-term storage stability. The dispersions of this invention may be easily formulated into a solids content of 20–50%. The constituent components and component proportions of the dispersions of this invention are extremely critical. Substitution of the defined components or significant alternation of the component proportions results in totally unsatisfactory dispersions. Also a precise process must be carefully followed to prepare these dispersions. Variations from these process limitations result in dispersions lacking the desired mechanical, acid ion, and storage stability.

The polyamides which are operable in this invention are the alcohol soluble polyamides derived from a diamine and a dicarboxylic acid. Specifically, the polyamide must be sufficiently soluble in a hot (i.e., up to about 150° C.) alcohol, such as primary amyl alcohol, or a hot alcohol-based solvent system which is substantially water immiscible, to form a 5-25 weight percent solution therein. As indicated, this class of polyamides may be derived from diamines such as ethylenediamine, pentamethylenediamine, hexamethylenediamine, decamethylenediamine, 1,4-diaminobutane, N-alkyl substituted derivatives of such diamines, and the like, and dicarboxylic acids such as adipic acid, sebacic acid, suberic acid, azelaic acid, pimelic acid, glutaric acid, isophthalic acid, terephthalic acid, and the like. A preferred class of polyamides are the amyl alcohol soluble interpolyamides of hexamethylene diamine adipate, hexamethylene diamine sebacate, and caprolactam. These three constituent components may be combined in the interpolyamide in any desired proportion so long as the resulting interpolyamide is soluble in hot primary amyl alcohol. Thus, interpolyamides of 10 to 50 weight percent hexamethylenediamine adipate, 10 to 45% hexamethylenediamine sebacate, and 30 to 45% caprolactam are suitable. Another example of amyl alcohol soluble polyamides suitable for use in this invention are the N-methoxy-methyl-polyhexamethylene adipamides in which from 20 to 60% of the amide hydrogen atoms have been replaced with alkoxymethyl groups.

It is essential that the dispersions of this invention contain at least one modifier, which may be a phenol, an aromatic alcohol or an aromatic glycol. Such a modifier must contain hydroxyl groups which interact as electron acceptors in hydrogen bonding with the amide carbonyl groups of the polyamide. For most practical purposes, this property may be expressed in terms that the modifier must be a solvent or partial solvent for the polyamide, or in other words, must at least swell the polyamide.

Examples of suitable phenols include resorcinol, hydroquinone, pyrocatechol, saligenin, phloroglucinol, and the various polynuclear polyhydroxy phenols such as bisphenol A (2,2-bis(4-hydroxyphenyl)propane), bisphenol F (bis(4 - hydroxyphenyl)methane), 4,4' - dihydroxydiphenyl ether, p-phenoxyphenol, and the like. Suitable aromatic alcohols include benzyl alcohol, 2-phenyl-ethyl alcohol, p-tert.-amyl phenoxy ethanol, 4,4'-dihydroxymethyl diphenyl oxide, dihydroxyethylmethyl diphenyloxide, 2,2-bis-(4-hydroxyethoxy phenyl) propane, and the ethylene oxide adducts of substituted phenols having the formula $R-C_6H_4-(O \cdot CH_2CH_2)_nOH$ wherein R is hydrogen or a $C_1$ to $C_9$ aliphatic radical and $n$ is a number from 1 to 9.

The term "aromatic glycol" as used herein includes dihydroxy and other polyhydroxy compounds. Suitable aromatic glycols may be obtained by the use of aromatic epoxy compounds which hydrolyze to the corresponding aromatic glycols under the process conditions employed to prepare the dispersions of this invention. Examples of such epoxy compounds include 1,2-epoxyethyl benzene, 1,2-epoxy-3-phenoxy propane, resorcinol diglycidyl ether and the condensation products of epichlorohydrin with various phenols such as bisphenol A, bisphenol F, hydroquinone, pyrocatechol, saligenin, phloroglucinol trihydroxyl diphenyl dimethyl methane, 4,4'-dihydroxy biphenyl, dihydroxyl diphenyl sulfone, various novolak resins, and the like. Where an epoxy compound is used, the degree of hydrolysis of the epoxy groups may be from 20% to 100%.

The use of closely related compounds as a modifier in this invention, such as aliphatic or cycloaliphatic compounds including 3,4-epoxy-cyclohexylmethyl-3,4-epoxy-cyclohexane carboxylate, and the diepoxides and triepoxides derived from the condensation of epichlorohydrin and glycerin, result in dispersions which coagulate after standing for only two or three days.

The preferred modifiers for use in this invention are resorcinol diglycidyl ether and the condensation product of epichlorohydrin and bisphenol A, which readily undergo hydrolysis to the corresponding aromatic glycols. Preferably, these epoxy compounds have an epoxide equivalent of 111–210, with the resorcinol diglycidyl ether having an epoxide equivalent range of 111–120, and the condensation product having an epoxide equivalent range of 170–210. The term "epoxide equivalent" refers to the weight of resin in grams which contain one gram equivalent of epoxy group.

The amount of modifier used in the dispersions of this invention must be from 20 to 30% based on the total weight of polyamide and the modifier. Dispersions containing less than 20% of the modifier are not storage stable and do not form satisfactory films. Greater than 30% of the modifier detracts from the desired properties of the polyamide.

In the preparation of the dispersions of this invention, the polyamide and modifier are dissolved in an alcohol or alcohol-based solvent system that is substantially water immiscible. The solvent may be heated, if necessary, to effect the dissolving of the polyamide. Amyl alcohol is the preferred solvent. Both the normal and iso amyl alcohol and mixtures thereof are suitable for use in this invention. However, the secondary and tertiary amyl alcohols are not operable in this invention since they are not solvents for the polyamide. Preferably, the primary amyl alcohol is saturated with water at its boiling point (i.e., contains about 15 weight percent water). The water saturated primary amyl alcohol is preferred for this invention because it dissolves the polymer in a shorter time than the anhydrous alcohol, and can be recycled directly back from the evaporation step, described below, without drying or redistillation. The anhydrous alcohol, however, is useful in the practice of this invention.

Another, but far less preferred, solvent system is a mixture of about 50% N-butyl alcohol and about 50% of a water immiscible solvent having a relatively high dipole moment, such as trichloroethylene, chloroform, 1,1,2-trichloroethane, and nitropropane. The principal objection to a mixed solvent system is that it complicates the solvent recovery and recycle in the evaporation step.

The concentration of polyamide and modifier in the primary amyl alcohol solution is important. This solution must contain 15 to 25% by weight of the polyamide and modifier, and 75 to 85% by weight of the alcohol. Smaller amounts of the alcohol result in polyamide particle sizes which are too large to obtain stable dispersions, and a higher concentration of the alcohol increases the quantity thereof that must be evaporated to yield a given amount of product. The polyamide must be completely in solution without any gel particles remaining undissolved. Such complete solution can be obtained by stirring the mixture vigorously at the reflux temperature for a minimum of one hour and preferably two hours.

The resulting solution of the polyamide and modifier is then emulsified in water. It is desirable, but not essential, that the water contain a previously added anionic surfactant such as sodium lauryl sulfate. Such surfactant is normally used in an amount of from 0.1 to 2%, based on the weight of solids. The addition of a small amount of alkali metal base, sufficient to neutralize the residual acid end groups of the polyamide, facilitates the emulsification. The alkali base, such as sodium or potassium hydroxide or carbonate, should be used in amount of 0.1 to 0.2%, based on the weight of polyamide. The surfactant and alkali metal base should not be used in amounts larger than indicated, since this tends to reduce the stability of the final product. To accomplish this emulsification, the solution should be added to the water, instead of adding the water to the solution, which would result in phase inversion (i.e., an emulsion of water in the solution). The emulsion can be prepared using any suitable high shear dispersing machine.

Thereafter, an aqueous solution of polyvinyl alcohol must be added to the resulting crude emulsion. It has been discovered that only one particular class of polyvinyl alcohol is operable in this invention. The polyvinyl alcohol (i.e., hydrolyzed polyvinyl acetate) must have a percent hydrolysis of 78–90% and a 4% water solution viscosity of 20–45 centipoise as determined at 20° by the familiar Hoeppler falling ball method. The use of a polyvinyl alcohol which does not meet these specifications results in an unstable dispersion.

It is critical that this aqueous solution contain about 10% by weight of the polyvinyl alcohol. Solutions containing substantially more or less than 10% polyvinyl alcohol produce unstable dispersions. The total amount of the aqueous solution, which is added to the crude emulsion, must be sufficient to supply 5 to 15% of polyvinyl alcohol, on a dry basis, based on the combined weight of the polyamide and modifier. Larger or smaller quantities of polyvinyl alcohol will not give a stable dispersion. To insure consistent mechanical stability, this aqueous polyvinyl alcohol solution preferably should be added to the crude emulsion gradually over a time period of 2 to 4 minutes.

After the aqueous polyvinyl alcohol solution is added to the crude emulsion, the emulsion is then subjected to evaporation to remove the primary amyl alcohol therefrom. This evaporation is usually conducted at atmospheric pressure. The rate at which the primary amyl alcohol is evaporated from the emulsion has a critical effect on the properties of the resulting dispersion. The evaporation must be conducted gradually over a time period of 3 to 8 hours. A more rapid evaporation rate results in a dispersion having unsatisfactory mechanical stability. Extending the evaporation time beyond 8 hours, results in a yield loss because of coagulation of the polyamide. The evaporation is continued until the vapor temperature starts to rise above the temperature of the azeotrope (about 96° C.), and the dispersion contains less than about 2% residual primary amyl alcohol.

The polyamide dispersions of this invention, prepared according to the explicit directions provided herein, dry at ambient temperatures to transparent films. The air dried films are strong and showed good adhesion to a variety of substrates; however, they are sensitive to water and will whiten and partially redisperse upon recontact with water. A brief heating period at the melting point of the polyamide (150–160° C.) render the films insensitive to water. The dispersions of this invention have good mechanical stability as determined by ability to withstand shearing forces. As a test standard, a dispersion is placed in a domestic high shear type blender such as a Waring Blendor, and run for 5 minutes. A properly prepared dispersion has less than about 3% coagulated material after this 5 minutes of agitation.

Dispersions of this invention have good storage stability. Samples have been retained for over four months without any noticeable thickening, coagulation or settling. In accelerated storage tests at 50° C., no changes were observed after two weeks. The stability of these dispersions to acids and salts is very good compared to previously known polyamide dispersions.

The dispersions of this invention may be used as adhesives to adhere together various different substrates. These dispersions also provide tough abrasion resistant top coats for various substrates. For example, these dispersions may be used to coat natural and synthetic leather to provide flexible abrasion resistant industrial straps, belting, luggage, and athletic goods. These dispersions provide abrasion resistant coatings for automotive seat covers, and seat belt webbing. The impregnation of cotton fabrics with the dispersions of this invention has been found to increase the abrasion resistance by 100 to 500% as measured by a laboratory Stoll-Flex abrasion tester. Other textile uses include protective coatings for thread, antifray coatings, finishing for improved hand, stiffener, label and seam adhesives. Application of these dispersions onto paper, provides grease resistant coatings. These dispersions are also useful to extend the life of paper making felts. These dispersions can also be used to obtain tough abrasion resistant coatings for wood products such as prefinished flooring, bowling pins, and parts for textile machinery. Since films prepared from these dispersions are resistant to hydrocarbons, these dispersions are suitable to prepare lining coatings for fuel tanks. Many other applications for the dispersion of this invention will be obvious to those skilled in the art, particularly wherever the toughness and abrasion resistance of a polyamide is desired to improve the serviceability or appearance of a product.

The dispersions of this invention are particularly suitable for use in compounding in typical textile treatment baths, including wash-wear treatment baths. Such wash-wear treatment baths are based upon N-methylol condensates of melamine or urea, such as melamine-formaldehyde condensate (i.e., monomethylol melamine), dimethylol melamine, trimethylol melamine, urea-formaldehyde condensate (i.e., monomethylol urea), dimethylol urea, trimethylol urea, tetramethylol urea, monomethylolethylene urea, dimethylolethylene urea dimethylol dihydroxyethylene urea, and the like. A catalyst is used in the wash-wear treatment bath to promote crosslinking between methylol groups of the condensate, and thus form a thermosetting resin when impregnated in a textile fabric. Suitable catalysts are the acid salts of metals, particularly acid salts of zinc and magnesium, such as zinc chloride, zinc nitrate and magnesium chloride, and also, ammonium sulfate.

The textile treatment baths prepared according to this invention comprise water, 4–12% by weight of the N-methylol condensate of melamine or urea, 0.5–2% of the acid salt catalyst, and 0.5–5% polyamide. Other components commonly added to wash-wear textile treatment baths may also be added, for example, fabric softeners such as non-ionic aqueous dispersions of low molecular weight (500–5000 weight average molecular weight) polyethylene.

The polyamide dispersions of the prior art are not stable towards the foreign ions supplied by such acid salts, and consequently, coagulate in a typical wash-wear treatment bath. However, the dispersions of the present invention are compatible with these wash-wear treatment baths. Thus, practitioners of the textile art may now impregnate fabrics in a single bath which imparts both wash-wear properties and abrasion resistance.

This invention is further illustrated by the following examples wherein percentages are in terms of percent by weight unless otherwise stated.

EXAMPLE 1

To a 2 liter glass resin kettle was charged 240 grams of an interpolyamide prepared from 41.3 parts of caprolactam, 38.6 parts of hexamethylene diamine adipate and 28.7 parts of hexamethylenediamine sebacate, 1140 grams of water saturated primary amyl alcohol and 60 grams of distilled water. This mixture was stirred vigorously at the reflux temperature for 2 hours to obtain complete solution of the polymer. Shortly before emulsification, 60 grams of an epoxy compound of epichlorohydrin and bisphenol A having an epoxy equivalent of 175–210 ("Epon" 828) was added to the amyl alcohol solution. Into the jacketed 1 gallon vessel of a Model L Kady Mill (Kinetic Dispersion Corp., Buffalo, New York) was placed 1200 grams of distilled water to which had been added 4.5 grams of a 30% aqueous solution of sodium lauryl sulfate ("Duponol" WAQE) and 0.5 grams of sodium carbonate. The mill was started and the polymer solution was then poured into the water. After milling for 10 minutes, 300 grams of a 10% solution of polyvinyl alcohol having a percent hydrolysis of 87–89% and a 4% water solution viscosity of 33–45 centipoise ("Elvanol" 50–42) was added in a thin stream over a period of 2–3 minutes. The milling was continued for an additional 20 minutes. The resulting emulsion was then placed in a clean 3 liter resin kettle set up as an evaporator. The azeotrope of amyl alcohol and water was distilled off over the period of six hours. The vapor temperature at the end of this evaporation was 99.5° C. with a distillate composition of 9 parts water to 1 part of amyl alcohol. The resulting polyamide dispersion weighed 1078 grams and contained 29.6% solids. This dispersion was cast to form a clear dry film at room temperature and had a high degree of mechanical stability. After 10 minutes of agitation in a Waring Blendor there was no coagulation of the dispersion. This dispersion had good shelf stability with only a small amount, i.e., 5% of the polymer solids, settling out of the dispersion after standing for 2 months.

EXAMPLE 2

The procedure of Example 1 was followed except that a grade of polyvinyl alcohol was used which was 81–82% hydrolyzed and had a solution viscosity of 21–25 centipoise ("Elvanol" 41–24). The resulting dispersion was film forming at room temperature and had excellent mechanical stability being unchanged after 10 minutes of agitation in a Waring Blendor. This dispersion had good storage stability with only a trace, 0.3% of the polymer solids settling out after 2 months.

EXAMPLE 3

To a 2 liter glass resin kettle was charged 187.5 grams of an interpolyamide prepared from 13 parts hexamethylenediamine adipate, 42 parts of hexamethylenediamine sebacate and 45 parts of caprolactam, 62.5 grams of the epoxy compound used in Example 1, 950 grams of water saturated primary amyl alcohol and 50 grams of distilled water. The mixture was stirred vigorously for 2 hours at the reflux temperature to obtain a complete solution. A water phase was prepared consisting of 1300 grams of distilled water, 16.7 grams of a 30% solution of sodium lauryl sulfate and 2.8 grams of a 10% solution of sodium hydroxide. A crude emulsion was prepared by pouring the polymer solution into the water and milling for 10 minutes. In this example, the emulsion was cooled to 10° C. before restarting the mill and adding 250 grams of a 10% solution of the polyvinyl alcohol described as Example 1. The milling was continued for 20 minutes after which the azeotrope of amyl alcohol and water was distilled off as in Example 1. This distillation was continued until the ratio of water to amyl alcohol in the distillate was 8.6 to 2.4. The dispersion of this example contained 28.8% solids and had a 1.1% residual amyl alcohol. This dispersion dried to a clear transparent film and had fair mechanical stability, withstanding 6 minutes of agitation in a Waring Blendor before coagulating.

EXAMPLE 4

The procedure used in Example 1 was followed except that a different type of epoxy compound, resorcinol diglycidyl ether ("Kopox"-159), was used in place of bisphenol A epichlorohydrin type. The resulting dispersion contained 22.1% solids and dried to a clear film at room temperature. It had good mechanical stability: only 2 grams of coagulated polymer material from 150 grams of dispersion were found after 10 minutes of agitation in a Waring Blendor. The dispersion had a fair storage stability with 10% of the polymer solids settling out after standing for two months.

EXAMPLE 5

The procedure used in Example 2 was followed except that a different modifier, bisphenol A, was used in place of the condensation product of bisphenol A with epichlorohydrin. The resulting dispersion contained 33.4% solids, and dried to a clear film at room temperature. The dispersion had good mechanical stability with only 0.2 gram of material coagulating from 150 grams of dispersion after 10 minutes of agitation in a Waring Blendor. The dispersion also showed good storage stability in an accelerated centrifuge test with only 1.8% of the solids settling.

EXAMPLE 6

The procedure used in Example 2 was followed except that a different modifier, p-tert.-amyl phenoxy ethanol, was used instead of the epoxy compound. The resulting dispersion contained 30.9% solids, and dried to a clear film at room temperature. The dispersion had good mechanical stability, and in an accelerated storage test employing a centrifuge, only 1.7% of the solids settled.

EXAMPLE 7

The procedure of Example 1 was followed except that no modifier was used. In this example, about 33% of the polymer coagulated out during the evaporation step. The remaining dispersion contained 11.1% solids and changed into a semi-solid pasty form after standing 1 day at room temperature. The material was mechanically stable but dried to a white powder at room temperature.

EXAMPLE 8

The procedure of Example 1 was followed except that the compound was replaced by an epoxy compound derived from the condensation of epichlorohydrin and glycerine ("Epon" 812). The resulting dispersion had very poor mechanical stability and coagulated after 5 seconds in a Waring Blendor. The dispersion also had unsatisfactory storage stability, coagulating after standing for only 16 hours.

EXAMPLE 9

The procedure of Example 1 was followed except that a grade of polyvinyl alcohol was used which was 99–100% hydrolyzed and had a 4% solution viscosity of 55–65 centipoise. The small particle size emulsion was not obtained after adding the polyvinyl alcohol and a large proportion of the polyamide resin coagulated during the evaporation step.

EXAMPLE 10

The procedure of Example 1 was followed except that a high viscosity grade of polyvinyl alcohol was used which was 78% hydrolyzed. During the first part of the evaporation step the emulsion broke and separated into a water layer and a polymer solution layer.

EXAMPLE 11

The procedure of Example 1 was followed except that the amyl alcohol-water azeotrope was evaporated at a rapid rate over a period of 2 hours and 20 minutes. This dispersion was film forming at room temperature, but had unsatisfactory mechanical stability being extremely coagulated after 10 seconds of mechanical agitation in a Waring Blendor.

EXAMPLE 12

The procedure of Example 1 was followed except that the amyl alcohol-water azeotrope was evaporated over the time period of 24 hours. The product had satisfactory, film-forming mechanical stability and storage stability properties, however a considerable portion of the polymer, representing a 23% yield loss, coagulated out during the extended period at elevated temperature.

Examples 13–16 illustrate the use of the dispersions of this invention in wash-wear textile treatment baths. In these particular examples, four different types of polyamide dispersions were used. The dispersion prepared in Example 1 was used to show the performance of the polyamides of this invention. "Polyamide dispersion A" was a 10% solids, film-forming, but mechanically unstable aqueous dispersion of an alcohol soluble interpolyamide of about 43.5 mole percent caprolactam, 21.5 mole percent hexamethylenediamine sebacate, and 35 mole percent hexamethylenediamine adipate. "Polyamide dispersion B" was a 20% solids, nonfilm-forming, mechanically stable aqueous dispersion of semi-crystalline, alcohol soluble interpolymer having the same component constituency as in dispersion A. "Polyamide dispersion C" was a dispersion similar to that prepared in Example 1, except that it contained only 4% of the polyvinyl alcohol based on the weight of polyamide and modifier.

EXAMPLE 13

The following aqueous wash-wear textile treatment bath was prepared.

| Component: | Grams/liter of formulation |
|---|---|
| Dimethylolethylene urea (45% solids) | 115 |
| Zn (NO$_3$)$_2$ catalyst (29% solids) | 14 |
| Urea | 10 |
| Non-ionic polyethylene dispersion ("Poly Flex" 503) (30% solids) | 12 |
| Modified starch ("Kofilm" 50) | 22 |

To this bath was added 35 g./l. (based on the formulation) of the polyamide dispersion prepared in Example 1. The polyamide dispersion was compatible with the bath, and thus formed a stable mixture suitable for textile fabric impregnation. Repetition of this example, using polyamide dispersion A, in place of the dispersion of this invention, results in a coagulated mass of polyamide rendering the bath unsuitable for use. Similar deleterious results are obtained when polyamide dispersions B and C are added to the wash-wear textile treatment bath.

EXAMPLE 14

Example 13 is repeated using melamine-formaldehyde condensate in place of the dimethylolethylene urea. Similar results are obtained.

EXAMPLE 15

The following aqueous wash-wear textile treatment bath was prepared.

| Component: | Grams/liter of formulation |
|---|---|
| Urea-formaldehyde condensate (48% solids) | 66 |
| Zn (NO$_3$)$_2$ catalyst (29% solids) | 12 |
| Non-ionic polyethylene dispersion ("Cyanalube" TSI Special) (24% solids) | 15 |
| Non-ionic surfactants ("Triton" X–100) | 1.2 |

To this bath was added 105 grams/liter (based on the formulation) of the polyamide dispersion prepared in Example 1. A homogeneous stable mixture was obtained. Repetition of this example using in place of the polyamide dispersion prepared in Example 1, either polyamide dispersion A, B or C results in a coagulated mass of polyamide in the bath.

EXAMPLE 16

The following aqueous wash-wear textile treatment bath was prepared.

| Component: | Grams/liter of formulation |
|---|---|
| Dimethylol dihydroxyethylene urea (47% solids) | 240 |
| Zn (NO$_3$)$_2$ catalyst (25% solids) | 43 |
| Non-ionic polyethylene dispersion ("Mykon" SF) (29% solids) | 29 |
| Non-ionic surfactant ("Triton" X-100) | 2.5 |

To this bath was added 35 g./l. (based on the formulation) of the polyamide dispersion prepared in Example 1. A homogeneous mixture was obtained. When either polyamide dispersion A, B or C is added to the bath, the polyamide coagulates.

What I claim is:

1. The process for preparing a film-forming aqueous polymer dispersion comprising:
   (a) completely dissolving 15–25% by weight of
      (1) a polyamide of a diamine and a dicarboxylic acid, and
      (2) as a modifier, a phenol, aromatic alcohol or aromatic glycol which at least swells said polyamide, or an epoxy compound hydrolyzable to such modifier, the amount of said modifier or epoxy compound being such as to provide 20–30% modifier based on the weight of siad polyamide and said modifier, in 75–85% by weight of an aliphatic alcohol-based solvent system which is substantially water-immiscible,
   (b) emulsifying the resulting solution in water, then
   (c) adding to and milling together with the resulting emulsion an aqueous solution containing about 10% by weight of a completely dissolved polyvinyl alcohol having a percent hydrolysis of 78–90%, and a 4% water solution viscosity of 20–45 centipoise as determined at 20° C. by the Hoeppler falling ball method, the amount of said aqueous solution being sufficient to supply 5–15% of said polyvinyl alcohol based on the total weight of said polyamide and said modifier, and thereafter,
   (d) gradually evaporating at least 98 weight percent of said alcohol-based solvent system from the emulsion over a time period of 3–8 hours.

2. The process of claim 1 wherein the said alcohol-based solvent system is a water-saturated amyl alcohol.

3. The process of claim 2 wherein the said modifier is an aromatic glycol.

4. The process for preparing a film-forming aqueous dispersion comprising:
   (a) completely dissolving 15–25% by weight of
      (1) an amyl alcohol soluble interpolyamide of hexamethylenediamine adipate, hexamethylenediamine sebacate, and caprolactam, and
      (2) an epoxy compound of epichlorohydrin and bisphenol A having an epoxy equivalent of 170–210, the amount of said epoxy compound being 20–30% based on the total weight of said interpolyamide and said epoxy compound, in 75–85% by weight of a water-saturated primary amyl alcohol,
   (b) emulsifying the resulting solution in water containing an anionic surfactant, then
   (c) gradually adding to the resulting emulsion over a time period of 2–4 minutes an aqueous solution containing about 10% by weight of a completely dissolved polyvinyl alcohol having a percent hydrolysis of 78–90%, and a 4% water solution viscosity of 20–45 centipoise as determined at 20° C. by the Hoeppler falling ball method, the amount of said aqueous solution being sufficient to supply 5–15% of said polyvinyl alcohol based on the total weight of said interpolyamide and said epoxy compound, and thereafter,
   (d) gradually evaporating at least 98 weight percent of said amyl alcohol from the emulsion over a time period of 3–8 hours.

5. The process of claim 1 wherein said polyamide is an amyl alcohol soluble interpolyamide of hexamethylenediamine adipate, hexamethylenediamine sebacate, and caprolactam.

6. The process of claim 5 wherein said modifier is an epoxy compound of epichlorohydrin and bis-phenol A having an original epoxy equivalent of 170–210, or an hydrolysis product thereof having 20–100% of the epoxy groups hydrolyzed.

7. A product produced by the process of claim 1.

8. A product produced by the process of claim 6.

References Cited

UNITED STATES PATENTS

| | | | |
|---|---|---|---|
| 2,214,402 | 9/1940 | Carothers | 260—29.2 |
| 2,405,965 | 8/1946 | Leekley | 260—29.2 |
| 2,443,893 | 6/1948 | Collins | 260—20.6 |
| 2,467,186 | 4/1949 | Cairns | 260—29.2 |
| 3,049,445 | 8/1962 | Lundgren et al. | 260—29.2 |

SAMUEL H. BLECH, *Primary Examiner.*

MURRAY TILLMAN, *Examiner.*

W. J. BRIGGS, *Assistant Examiner.*